US012479388B2

(12) United States Patent
Aller

(10) Patent No.: US 12,479,388 B2
(45) Date of Patent: Nov. 25, 2025

(54) COLLAPSIBLE PRIVACY PARTITION FOR A VEHICLE

(71) Applicant: GM Global Technology Operations LLC, Detroit, MI (US)

(72) Inventor: David M. Aller, Grosse Pointe Farms, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 446 days.

(21) Appl. No.: 18/157,128

(22) Filed: Jan. 20, 2023

(65) Prior Publication Data

US 2024/0246504 A1 Jul. 25, 2024

(51) Int. Cl.
*B60R 21/02* (2006.01)
(52) U.S. Cl.
CPC .................. *B60R 21/026* (2013.01)
(58) Field of Classification Search
CPC . B60N 2/242; B60N 2/60; B60N 2/91; B60N 99/00; B60N 2002/905; B60R 21/026; B60R 21/06; B60R 2021/022; B64D 11/0606

USPC .................................................. 296/24.4, 64
See application file for complete search history.

(56) References Cited

U.S. PATENT DOCUMENTS

| 10,046,685 | B1 * | 8/2018 | Bryant | E06B 9/42 |
| 2003/0146654 | A1 * | 8/2003 | Nguyen | B64D 11/0606 297/232 |
| 2022/0161930 | A1 * | 5/2022 | Aten | B64D 11/0606 |

FOREIGN PATENT DOCUMENTS

| EP | 3904209 A1 * | 11/2021 | ........... B60N 2/6009 |
| JP | 2016159866 A * | 9/2016 | ............... B60N 2/91 |

* cited by examiner

*Primary Examiner* — Jason S Daniels
(74) *Attorney, Agent, or Firm* — CANTOR COLBURN LLP

(57) ABSTRACT

A vehicle seat includes a seat including a seat base and a seatback. A collapsible privacy partition system is arranged adjacent the seat. The collapsible privacy partition system includes a first frame member and a second frame member, and a privacy partition connected to the first frame member and the second frame member. The privacy partition being selectively shiftable between a stowed configuration with the second frame member extending along the first frame member and a deployed configuration with the second frame member extending along the seat base.

20 Claims, 3 Drawing Sheets

COLLAPSIBLE PRIVACY PARTITION FOR A VEHICLE

INTRODUCTION

The subject disclosure relates to the art of privacy partitions and, more specifically, a collapsible privacy partition for a vehicle.

Vehicles that transport multiple, unrelated passengers such as aircraft shuttles, taxis, buses and the like lack privacy. That is, passengers seated next to a passenger desiring privacy can easily view work product by a simple turn of the head. While paperwork is very easily viewed, computer screens are also prone to a curious peeper. A passenger can easily view a computer screen of someone seated adjacent. Many travelers prefer to keep their work private.

Manufacturers have designed accessories that can be mounted to the computer screen to limit viewing to a specific angular range. While somewhat effective, the accessory is difficult to transport, does not allow a laptop to be easily closed, and does not completely prevent visual access to displayed matter. Accordingly, it is desirable to provide a system that can prevent adjacent passengers from looking at each other's work product.

SUMMARY

A vehicle seat, in accordance with a non-limiting example, includes a seat including a seat base and a seatback. A collapsible privacy partition system is arranged adjacent the seat. The collapsible privacy partition system includes a first frame member and a second frame member, and a privacy partition connected to the first frame member and the second frame member. The privacy partition being selectively shiftable between a stowed configuration with the second frame member extending along the first frame member and a deployed configuration with the second frame member extending along the seat base.

In addition to one or more of the features described herein the seat includes a seat frame and the collapsible privacy partition system includes a frame support arranged adjacent to and extending along a portion of the seat frame.

In addition to one or more of the features described herein the first frame member includes a first end fixedly connected to the frame support and a second end that is cantilevered from the frame support.

In addition to one or more of the features described herein the second frame member includes a first end portion pivotally connected to the first end of the first frame member and a second end portion that is cantilevered from the first frame member.

In addition to one or more of the features described herein the privacy partition includes a base edge, a first side edge, a second side edge and an upper edge, the base edge being coupled to the second frame member between the first end portion and the second end portion.

In addition to one or more of the features described herein the first side edge of the privacy partition is coupled to the first frame member between the first end and the second end.

In addition to one or more of the features described herein a stiffening member extending along the upper edge of the privacy partition.

In addition to one or more of the features described herein the stiffening member includes a first end section spaced from the second end of the first frame member a first non-zero distance and the a second end section spaced from the second end of the first frame member a second non-zero distance that is greater than the first non-zero distance.

In addition to one or more of the features described herein the second side edge of the privacy partition is unsupported.

In addition to one or more of the features described herein a motor connected to the second frame member, the motor being selectively operable to rotate the second frame member to transition the privacy partition between the stowed configuration and the deployed configuration.

A vehicle, in accordance with a non-limiting example, includes a body defining a passenger compartment. A seat including a seat base and a seatback is arranged in the passenger compartment. A collapsible privacy partition system is arranged adjacent the seat. The collapsible privacy partition system includes a first frame member and a second frame member, and a privacy partition connected to the first frame member and the second frame member. The privacy partition is selectively shiftable between a stowed configuration with the second frame member extending along the first frame member and a deployed configuration with the second frame member extending along the seat base.

In addition to one or more of the features described herein the seat includes a seat frame and the collapsible privacy partition system includes a frame support arranged adjacent to and extending along a portion of the seat frame.

In addition to one or more of the features described herein the first frame member includes a first end fixedly connected to the frame support and a second end that is cantilevered from the frame support.

In addition to one or more of the features described herein the second frame member includes a first end portion pivotally connected to the first end of the first frame member and a second end portion that is cantilevered from the first frame member.

In addition to one or more of the features described herein the privacy partition includes a base edge, a first side edge, a second side edge and an upper edge, the base edge being coupled to the second frame member between the first end portion and the second end portion.

In addition to one or more of the features described herein the first side edge of the privacy partition is coupled to the first frame member between the first end and the second end.

In addition to one or more of the features described herein a stiffening member extending along the upper edge of the privacy partition.

In addition to one or more of the features described herein the stiffening member includes a first end section spaced from the second end of the first frame member a first non-zero distance and the a second end section spaced from the second end of the first frame member a second non-zero distance that is greater than the first non-zero distance.

In addition to one or more of the features described herein the second side edge of the privacy partition is unsupported.

In addition to one or more of the features described herein a motor connected to the second frame member, the motor being selectively operable to rotate the second frame member to transition the privacy partition between the stowed configuration and the deployed configuration.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
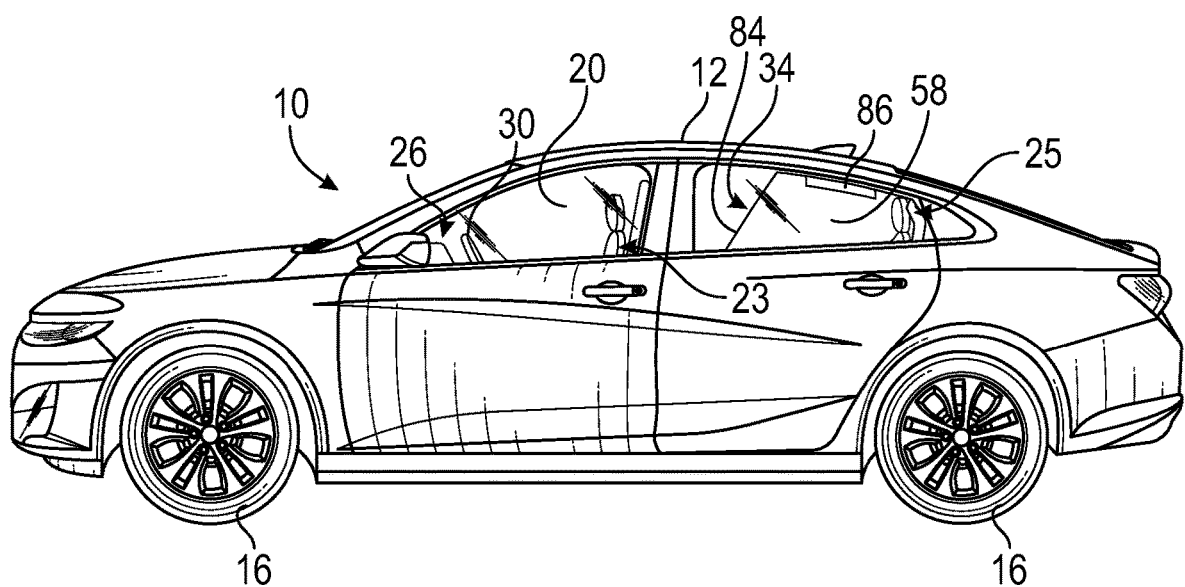
FIG. 1 is a left side view of a vehicle including a seat having a collapsible privacy partition, in accordance with a non-limiting example.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

A vehicle, in accordance with a non-limiting example, is indicated generally at 10 in FIG. 1. Vehicle 10 includes a body 12 supported on a plurality of wheels 16. At least two of the plurality of wheels 16 are steerable. Body 12 defines, in part, a passenger compartment 20 having front seats, one of which is indicated at 23, and rear seats 25. Front seat 23 is positioned behind a dashboard 26. A steering control system 30 is arranged between front seat 23 and dashboard 26. Rear seat 25 is provided with a collapsible privacy partition system 34 that shields a passenger from adjacent passengers. At this point, it should be understood that while shown as a conventional passenger vehicle, vehicle 10 may be an autonomous vehicle having various seating configurations.

Figure 2:
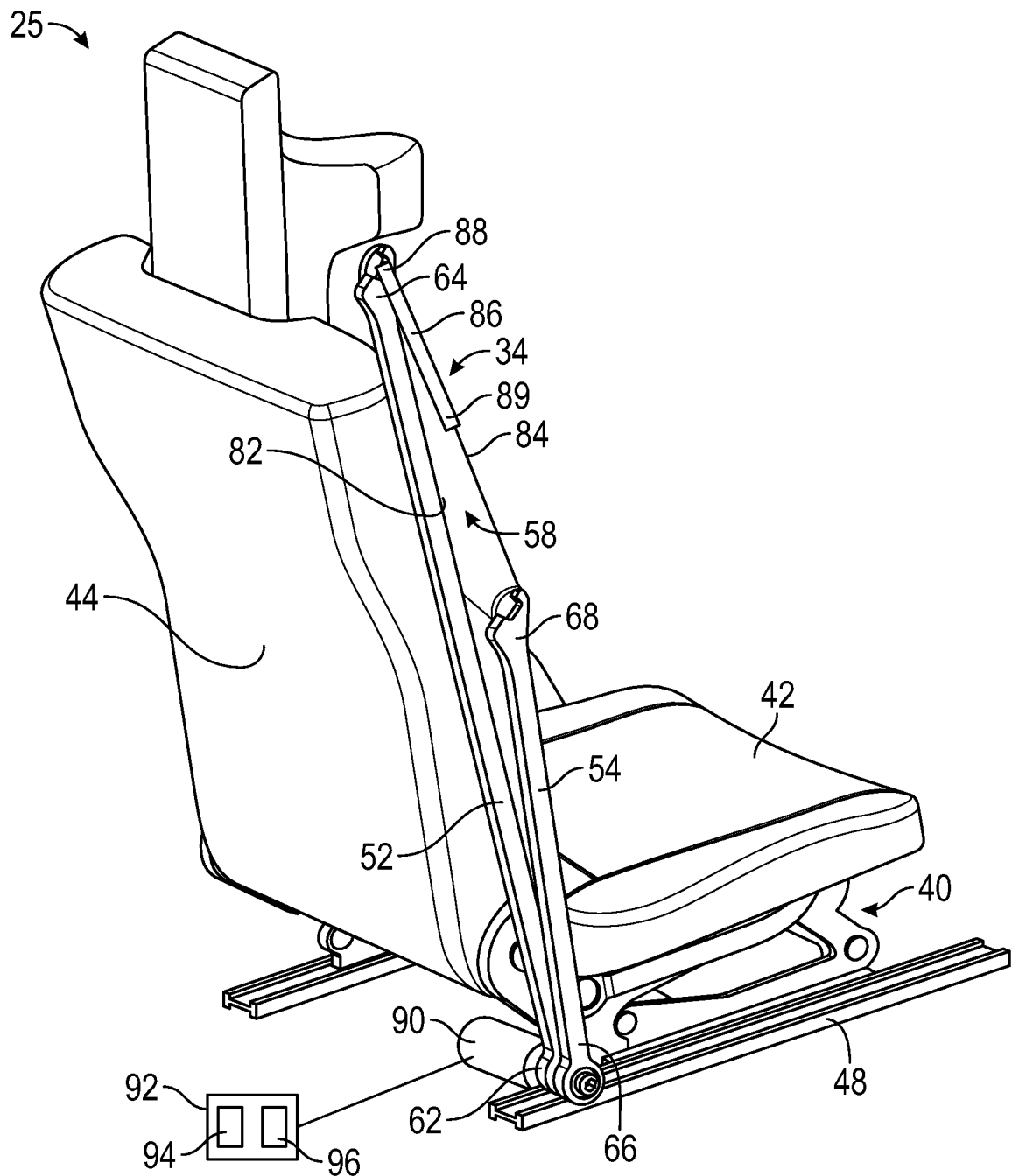
FIG. 2 is a right rear perspective view of the seat of FIG. 1 depicting the collapsible privacy screen in a stowed configuration.

Referring to FIG. 2, rear seat 25 includes a seat frame 40 mounted to body 12 or a vehicle frame (not shown) in passenger compartment 20. Seat frame 40 supports a seat base 42 and a seatback 44. Seatback 44 may be pivotally mounted relative to seat base 42. Further, seat base 42 and seatback 44 may include one or more adjustable components (not separately labeled) that promote passenger comfort. In a non-limiting example, collapsible privacy partition system 34 is mounted in passenger compartment 20 adjacent to rear seat 25. It should however be understood that collapsible privacy partition system 34 may be mounted anywhere in passenger compartment 20 and/or multiple collapsible privacy partitions may be provided in vehicle 10. Collapsible privacy partition system 34 includes a frame support 48 mounted in passenger compartment 20 alongside and/or as part of seat frame 40.

In a non-limiting example, a first frame member 52 is fixedly connected to frame support 48. A second frame member 54 is pivotably connected relative to first frame member 52. A foldable privacy partition 58 is supported by first frame member 52 and second frame member 54. In a non-limiting example, first frame member 52 includes a first end 62 fixedly connected to frame support 48 and a second end 64. Second end 64 is cantilevered from frame support 48. Second frame member 54 includes a first end portion 66 and a second end portion 68. First end portion 66 is pivotably connected to frame support 48 relative to first frame member 52. Second end portion 68 is cantilevered from frame support 48.

In a non-limiting example, first frame member 52 and second frame member 54 are non-structural. That is, first frame member 52 and second frame member 54 are flexible and thus will give way when exposed to low impact forces. As such, first frame member 52 and second frame member 54 may be formed from a variety of soft materials such as various plastic composites. First frame member 52 and second frame member 54 are designed to comply with various motor vehicle safety standards.

Figure 3:
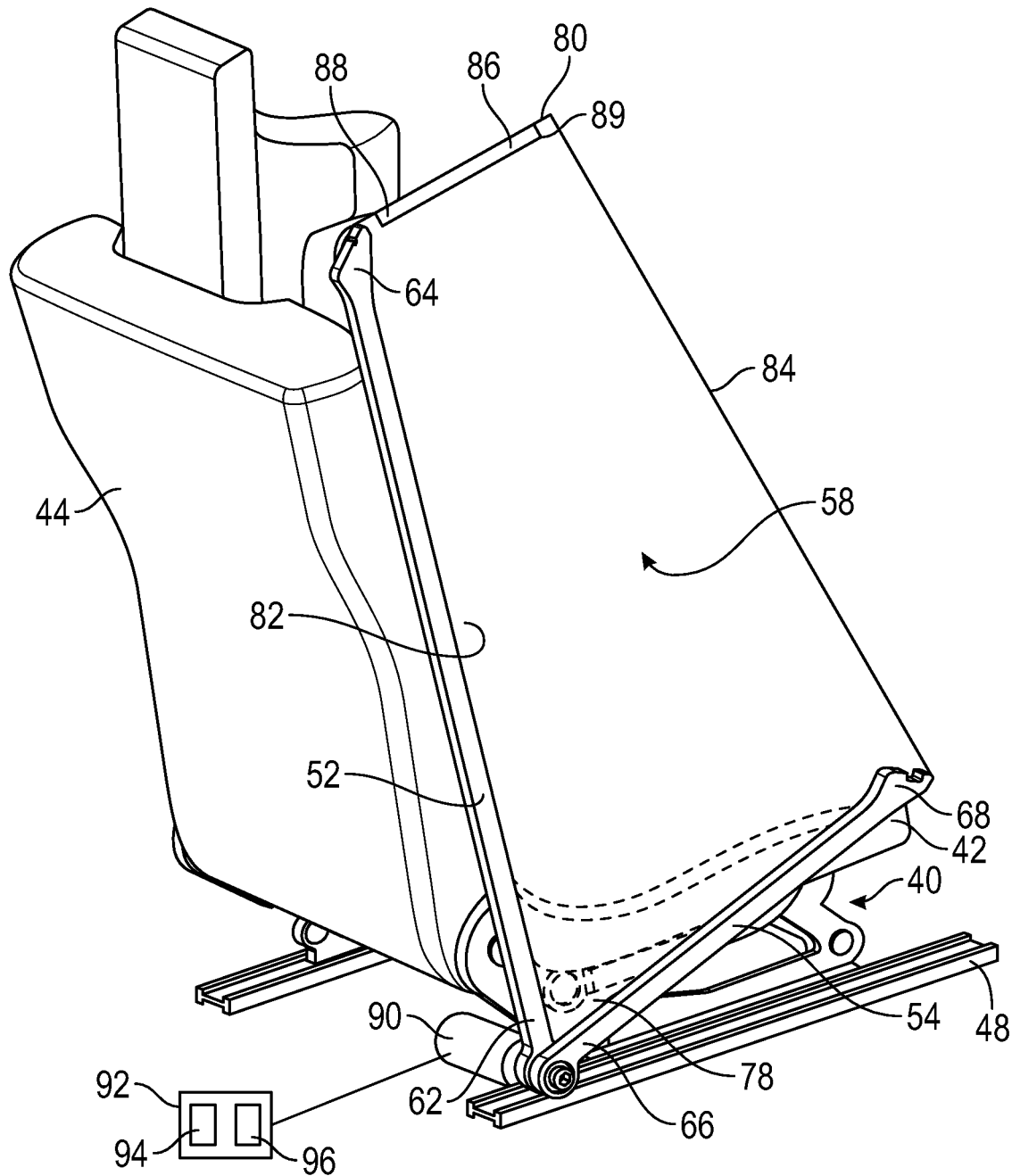
FIG. 3 is a right rear perspective view of the seat of FIG. 2 depicting the collapsible privacy screen in a deployed configuration.

Referring to FIG. 3 and with continued reference to FIGS. 1 and 2, privacy partition 58 is formed from an opaque or semi-transparent or translucent flexible material that may readily transition between the stowed (FIG. 2) and deployed (FIG. 3) configurations. Privacy partition 58 includes a base edge 78, an upper edge 80, a first side edge 82, and a second side edge 84. First side edge 82 is connected to first frame member 52 between first end 62 and second end 64. Base edge 78 is coupled to second frame member 54 between first end portion 66 and second end portion 68. A stiffening member 86 is provided on upper edge 80.

Stiffening member 86 includes a first end section 88 and a second end section 89. First end section 88 is spaced from second end 64 of first frame member 52 a first non-zero distance and second end section 89 is spaced from second end 68 of first frame member 52 a second non-zero distance that is greater than the first non-zero distance. Stiffening member 86 helps support or open privacy partition 58 when deployed. In the non-limiting example shown, second side edge 84 of privacy partition 58 is unsupported.

Privacy partition 58 may be shifted between the stowed configuration (FIG. 2) and the deployed configuration (FIG. 3) be pivoting or rotating second frame member 54 relative to first frame member 52. More specifically, rotating first end portion 66 of second frame member 54 relative to first end 62 of first frame member 52 effectively lowering second end portion 68 causes privacy partition 58 to expand outwardly and transition from a folded or stowed configuration (FIG. 2) and an open or deployed configuration (FIG. 3).

In a non-limiting example, a motor 90 may be operatively connected to second frame member 54 at first end portion 66. Motor 90 is coupled to a motor controller 92 having an actuator 94 and a control module 96. Actuator 94, when engaged, signals control module 96 to operate motor 90 to rotate second frame member 54 to either deploy or stow privacy partition 58. Regardless of how the transition occurs (i.e., manually, or automatically) in the deployed configuration, privacy partition 58 creates a privacy barrier which shields a passenger in rear seat 25 from prying eyes. In the event that rear seat 25 is a middle seat, multiple collapsible privacy partition systems 34 may be employed and selectively deployed. In a non-limiting example, a spring (not shown) may be employed in connection with privacy partition 58. The spring may provide a biasing force that aids in deployment and/or retraction of privacy partition 58.

In a non-limiting example, actuator 94 may be activated to selectively deploy and retract privacy partition 58. The degree of deployment/retraction may be controlled through actuator 94 in a manner similar to that of raising and lowering an electric window. In addition, control module 96 may be programmed to interact with various vehicle systems including fobs (not shown) and seat sensors (also not shown) to control deployment of privacy partition 58. In a non-limiting example, control module 96 may transition privacy partition to a retracted position as a default, i.e., when vehicle 10 is turned off (via key fob/start button), allowing for enhanced entry/egress. If the occupant wishes to use privacy partition 58 while vehicle 10 is parked/turned off, the occupant may override the default with the seat mounted controls.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vehicle seat comprising:
   a seat including a seat base and a seatback; and
   a collapsible privacy partition system arranged adjacent the seat, the collapsible privacy partition system including a first frame member and a second frame member, and a privacy partition connected to the first frame member and the second frame member, the privacy partition being selectively shiftable between a stowed configuration with the second frame member extending along the first frame member and a deployed configuration with the second frame member extending along the seat base,
   wherein the first frame member extends along the seatback, and
   wherein the second frame member is rotatably coupled to the first frame member at a position below an entirety of the seatback.

2. The vehicle seat according to claim 1, wherein the seat includes a seat frame and the collapsible privacy partition system includes a frame support arranged adjacent to and extending along a portion of the seat frame.

3. The vehicle seat according to claim 2, wherein the first frame member includes a first end fixedly connected to the frame support and a second end that is cantilevered from the frame support.

4. The vehicle seat according to claim 3, wherein the second frame member includes a first end portion pivotally connected to the first end of the first frame member and a second end portion that is cantilevered from the first frame member.

5. The vehicle seat according to claim 4, wherein the privacy partition includes a base edge, a first side edge, a second side edge and an upper edge, the base edge being coupled to the second frame member between the first end portion and the second end portion.

6. The vehicle seat according to claim 1, further comprising a motor connected to the second frame member, the motor being selectively operable to rotate the second frame member to transition the privacy partition between the stowed configuration and the deployed configuration.

7. A vehicle comprising:
   a body defining a passenger compartment; and
   a vehicle seat according to claim 1.

8. The vehicle according to claim 7, further comprising a motor connected to the second frame member, the motor being selectively operable to rotate the second frame member to transition the privacy partition between the stowed configuration and the deployed configuration.

9. The vehicle according to claim 7, wherein the seat includes a seat frame and the collapsible privacy partition system includes a frame support arranged adjacent to and extending along a portion of the seat frame.

10. The vehicle according to claim 9, wherein the first frame member includes a first end fixedly connected to the frame support and a second end that is cantilevered from the frame support.

11. The vehicle according to claim 10, wherein the second frame member includes a first end portion pivotally connected to the first end of the first frame member and a second end portion that is cantilevered from the first frame member.

12. The vehicle according to claim 11, wherein the privacy partition includes a base edge, a first side edge, a second side edge and an upper edge, the base edge being coupled to the second frame member between the first end portion and the second end portion.

13. A vehicle seat comprising:
   a seat including a seat base and a seatback; and
   a collapsible privacy partition system arranged adjacent the seat, the collapsible privacy partition system including a first frame member and a second frame member, and a privacy partition connected to the first frame member and the second frame member, the privacy partition being selectively shiftable between a stowed configuration with the second frame member extending along the first frame member and a deployed configuration with the second frame member extending along the seat base,
   wherein the seat includes a seat frame and the collapsible privacy partition system includes a frame support arranged adjacent to and extending along a portion of the seat frame,
   wherein the first frame member includes a first end fixedly connected to the frame support and a second end that is cantilevered from the frame support,
   wherein the second frame member includes a first end portion pivotally connected to the first end of the first frame member and a second end portion that is cantilevered from the first frame member,
   wherein the privacy partition includes a base edge, a first side edge, a second side edge and an upper edge, the base edge being coupled to the second frame member between the first end portion and the second end portion, and wherein the first side edge of the privacy partition is coupled to the first frame member between the first end and the second end.

14. The vehicle seat according to claim 13, further comprising a stiffening member extending along the upper edge of the privacy partition.

15. The vehicle seat according to claim 14, wherein the stiffening member includes a first end section spaced from the second end of the first frame member a first non-zero distance and the a second end section spaced from the second end of the first frame member a second non-zero distance that is greater than the first non-zero distance.

16. The vehicle seat according to claim 15, wherein the second side edge of the privacy partition is unsupported.

17. A vehicle comprising:
a body defining a passenger compartment;
a seat including a seat base and a seatback arranged in the passenger compartment; and
a collapsible privacy partition system arranged adjacent the seat, the collapsible privacy partition system including a first frame member and a second frame member, and a privacy partition connected to the first frame member and the second frame member, the privacy partition being selectively shiftable between a stowed configuration with the second frame member extending along the first frame member and a deployed configuration with the second frame member extending along the seat base, wherein the seat includes a seat frame and the collapsible privacy partition system includes a frame support arranged adjacent to and extending along a portion of the seat frame, wherein the first frame member includes a first end fixedly connected to the frame support and a second end that is cantilevered from the frame support, wherein the second frame member includes a first end portion pivotally connected to the first end of the first frame member and a second end portion that is cantilevered from the first frame member, wherein the privacy partition includes a base edge, a first side edge, a second side edge and an upper edge, the base edge being coupled to the second frame member between the first end portion and the second end portion, and wherein the first side edge of the privacy partition is coupled to the first frame member between the first end and the second end.

18. The vehicle according to claim 17, further comprising a stiffening member extending along the upper edge of the privacy partition.

19. The vehicle according to claim 18, wherein the stiffening member includes a first end section spaced from the second end of the first frame member a first non-zero distance and the a second end section spaced from the second end of the first frame member a second non-zero distance that is greater than the first non-zero distance.

20. The vehicle according to claim 19, wherein the second side edge of the privacy partition is unsupported.

* * * * *